United States Patent
Shi

(10) Patent No.: US 10,572,241 B2
(45) Date of Patent: Feb. 25, 2020

(54) METHOD AND APPARATUS FOR INSTALLING OPERATION SYSTEM

(71) Applicant: BEIJING BAIDU NETCOM SCIENCE AND TECHNOLOGY CO., LTD., Beijing (CN)

(72) Inventor: Ziye Shi, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/740,163

(22) PCT Filed: Nov. 24, 2015

(86) PCT No.: PCT/CN2015/095459
§ 371 (c)(1),
(2) Date: Dec. 27, 2017

(87) PCT Pub. No.: WO2017/031847
PCT Pub. Date: Mar. 2, 2017

(65) Prior Publication Data
US 2018/0196659 A1      Jul. 12, 2018

(30) Foreign Application Priority Data
Aug. 25, 2015   (CN) .......................... 2015 1 0526145

(51) Int. Cl.
*G06F 8/65*      (2018.01)
*G06F 8/61*      (2018.01)
(Continued)

(52) U.S. Cl.
CPC .................. *G06F 8/65* (2013.01); *G06F 8/10* (2013.01); *G06F 8/61* (2013.01); *G06F 8/77* (2013.01); *G06F 9/44505* (2013.01)

(58) Field of Classification Search
CPC .......... G06F 8/60–65; G06F 8/10; G06F 8/61; G06F 8/77; G06F 9/44505
See application file for complete search history.

(56) References Cited

U.S. PATENT DOCUMENTS 6,963,981 B1 * 11/2005 Bailey ....................... G06F 8/60
726/22
7,904,901 B1 * 3/2011 Tormasov ........... G06F 9/44505
717/178
(Continued)

FOREIGN PATENT DOCUMENTS

CN      101763277      6/2010
CN      101937351      1/2011
(Continued)

OTHER PUBLICATIONS

Neil McNab et al., "An implementation of the Linux software repository model for other operating systems," 2009 [retrieved on Dec. 6, 2019], Proceedings of the 2nd International Workshop on Hot Topics in Software Upgrades, Article No. 6, pp. 1-6, downloaded from <url>:https://dl.acm.org. (Year: 2009).*
(Continued)

*Primary Examiner* — Thuy Dao
*Assistant Examiner* — Stephen D Berman
(74) *Attorney, Agent, or Firm* — Hodgson Russ LLP

(57) ABSTRACT

A method and apparatus for installing an operating system. Data of a first operation system is acquired, and the first operation system is installed and launched according to the data of the first operation system. Configuration information of the first operation system is modified to add installation related information of a second operation system, after the first operation system is launched. Data of the second operation system is acquired according to the installation related information of the second operation system, and the
(Continued)

--- acquiring data of a first operation system, and installing and launching the first operation system according to the data of the first operation system — S11 modifying configuration information of the first operation system to add installation related information of a second operation system after launching the first operation system — S12 acquiring data of the second operation system according to the installation related information of the second operation system, and installing the second operation system to replace the first operation system according to the data of the second operation system — S13 second operation system is installed to replace the first operation system according to the data of the second operation system.

18 Claims, 2 Drawing Sheets

(51) Int. Cl.
*G06F 8/10* (2018.01)
*G06F 8/77* (2018.01)
*G06F 9/445* (2018.01)

(56) References Cited

U.S. PATENT DOCUMENTS

| | | | | |
|---|---|---|---|---|
| 8,151,021 B1* | 4/2012 | Glade | ............ | G06F 8/65 710/62 |
| 8,505,005 B1* | 8/2013 | Bos | ............ | G06F 8/61 717/177 |
| 8,510,732 B2* | 8/2013 | Chevrette | ............ | G06F 8/65 717/174 |
| 8,752,039 B1* | 6/2014 | Bapat | ............ | G06F 8/65 717/171 |
| 8,782,632 B1* | 7/2014 | Chigurapati | ............ | G06F 8/65 717/172 |
| 9,424,017 B2* | 8/2016 | Macken | ............ | G06F 8/61 |
| 9,715,400 B1* | 7/2017 | Sethuramalingam | ............ | G06F 9/44505 |
| 2006/0136704 A1* | 6/2006 | Arendt | ............ | G06F 9/4405 713/2 |
| 2012/0131179 A1* | 5/2012 | Hu | ............ | G06F 9/4416 709/224 |
| 2012/0304165 A1* | 11/2012 | Bechtel | ............ | G06F 8/61 717/174 |

FOREIGN PATENT DOCUMENTS

| | | |
|---|---|---|
| CN | 103164238 | 6/2013 |
| CN | 103294490 | 9/2013 |
| CN | 103984572 | 8/2014 |
| JP | H10133860 | 5/1998 |

OTHER PUBLICATIONS

David Collins, "Using VMWare and live CD's to configure a secure, flexible, easy to manage computer lab environment," 2006 [retrieved on Dec. 6, 2019], Journal of Computing Sciences in Colleges, vol. 21, Issue 4, pp. 273-277, downloaded from <url>:https://dl.acm.org. (Year: 2006).*

D. Pardo Garrido et al., "OpenGnSys: Centralized management and deployment of operating systems in the classroom," 2013 [retrieved on Dec. 6, 2019], 8th Iberian Conference on Information Systems and Technologies (CISTI), pp. 1-7, downloaded from <url>:https://ieeexplore.ieee.org. (Year: 2013).*

WIPO, ISR for PCT/CN2015/095459, dated May 30, 2016.

SIPO, Office Action for CN App. No. 201510526145, dated Nov. 6, 2017.

"A Dedicated Server for Reinstalling Linux Remotely", legolas_is, https://wenku.baidu.com/view/9d9c5526aaea998fcc220e41.html, Nov. 1, 2011.

"Kickstart Automation Strategy", smile_nagios, https://jingyan.baidu.com/season/45997, Oct. 18, 2014.

SIPO, Second Office Action for CN Application No. 201510526145, dated May 16, 2018.

Ogawa et al., "Conception of Stateless Virtual Clusters," IPSJ SIG Technical Report, 2007, No. 88, pp. 43-48.

JPO, Office Action for JP Application No. 2018505437, dated Feb. 1, 2019.

* cited by examiner

METHOD AND APPARATUS FOR INSTALLING OPERATION SYSTEM

CROSS-REFERENCE TO RELATED APPLICATION

This application is a U.S. national phase of International Application PCT/CN2015/095459, with an international filing date of Nov. 24, 2015, which claims priority to Chinese Patent Application No. 201510526145.X, filed on Aug. 25, 2015, titled with "method and apparatus for installing operation system" and filed by BEIJING BAIDU NETCOM SCIENCE AND TECHNOLOGY CO., LTD., the entire contents of which are incorporated herein by reference.

TECHNICAL FIELD

The present disclosure relates to the field of computer system technology, and more particularly, to a method and an apparatus for installing an operation system.

BACKGROUND

Operation system (OS) is a computer program for managing and controlling computer hardware and software resources, which is the most basic system software. There are different types of operation systems, such as Windows, Linux and the like. A user may choose an appropriate operation system for installation as demanded.

In related arts, generally, a desired operation system is manually installed on a computer with an aid of a compact disc. Alternatively, in a large sized data center, such as an Internet Data Center (IDC), a remote control and installation command is sent to a server in which an operation system is to be installed through a unified installation platform. The server may acquire data of a default operation system from a preset location according to the remote control and installation command, to realize the installation of the default operation system. However, the types of the default operation systems are limited, for example there are generally only three types of default operation systems. The user still needs to manually install an operation system other than the three default operation systems. Efficiency, cost and accuracy of a manual installation will be not satisfactory.

SUMMARY

Embodiments of the present disclosure provide a method for installing an operation system. The method includes: acquiring data of a first operation system, and installing and launching the first operation system according to the data of the first operation system; modifying configuration information of the first operation system to add installation related information of a second operation system after launching the first operation system; and acquiring data of the second operation system according to the installation related information of the second operation system, and installing the second operation system to replace the first operation system according to the data of the second operation system.

Embodiments of the present disclosure further provide an electronic device. The electronic device includes one or more processors, a memory and one or more programs stored in the memory. When the one or more programs are executed by the one or more processors, the above method is executed.

Embodiments of the present disclosure further provide a non-transitory computer readable medium. The computer storage medium has one or more modules stored therein. When the one or more modules are executed, the above method is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
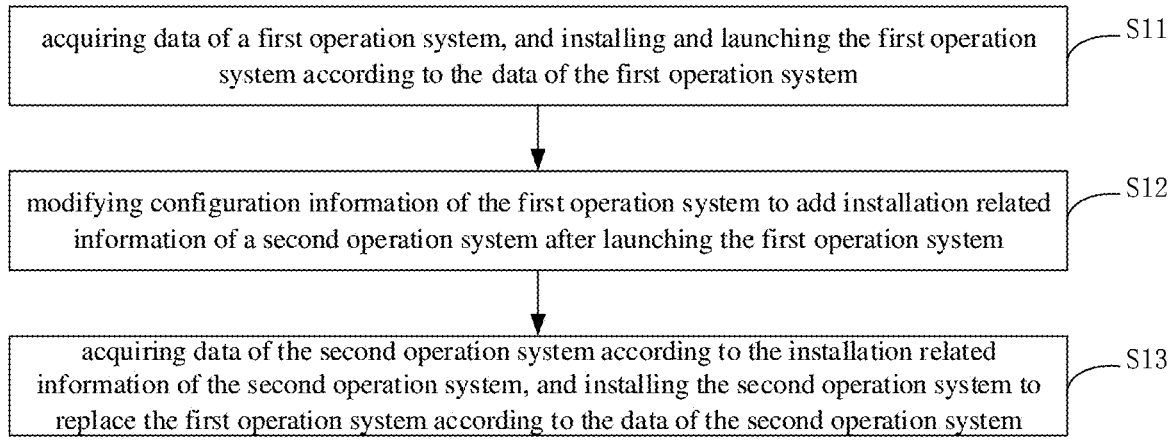
FIG. 1 is a flow chart illustrating a method for installing an operation system according to an embodiment of the present disclosure.

Embodiments of the present disclosure will be described in detail as follows and examples of the embodiments are illustrated in the drawings. The same or similar elements and the elements having the same or similar functions are denoted by like reference numerals throughout the descriptions. The embodiments described herein with reference to the drawings are explanatory, serve to explain the present disclosure, and are not construed to limit the present disclosure. Instead, the embodiments of the present disclosure comprise all the variants, modifications and their equivalents within the spirit and scope of the present disclosure as defined by the appended claims.

FIG. 1 is a flow chart illustrating a method for installing an operation system according to an embodiment of the present disclosure. The method includes the followings.

In block S11, data of a first operation system is acquired, and the first operation system is installed and launched according to the data of the first operation system.

The first operation system may be installed via a general way of installing operation systems, for example with an aid of a compact disc, or through a remote control and installation instruction.

After the first operation system is installed, the first operation system may be automatically launched.

In block S12, configuration information of the first operation system is modified to add installation related information of a second operation system after the first operation system is launched.

In related arts, when a user desires to install one operation system, this operation system is directly installed.

In embodiments, when the user desires to install one operation system (such as the second operation system), another operation system (such as the first operation system) is used as an interim medium to realize an installation of the desired operation system.

When the first operation system is used as the interim medium, the configuration information of the first operation system may be modified to contain the installation related information of the second operation system, such that the second operation system is installed according to the installation related information of the second operation system.

In block S13, data of the second operation system is acquired according to the installation related information of the second operation system, and the second operation system is installed to replace the first operation system according to the data of the second operation system.

After the data of the second operation system is acquired, the second operation system may be installed according to the data of the second operation system.

When the second operation system is installed, the second operation system may overwrite the already installed first operation system, to realize a replacement of the first operation system by the second operation system, to finally complete the installation of the second operation system.

In embodiments, the first operation system is firstly installed. Furthermore, the second operation system is installed through the first operation system. A desired operation system is finally installed through two installations of the operation systems, which does not need to install the operation system manually with an aid of a compact disc. Therefore, problems caused by a manual installation of the operation system may be avoided, thereby improving efficiency of the installation of the operation system, reducing a cost of the installation of the operation system and improving accuracy of the installation of the operation system.

Figure 2:
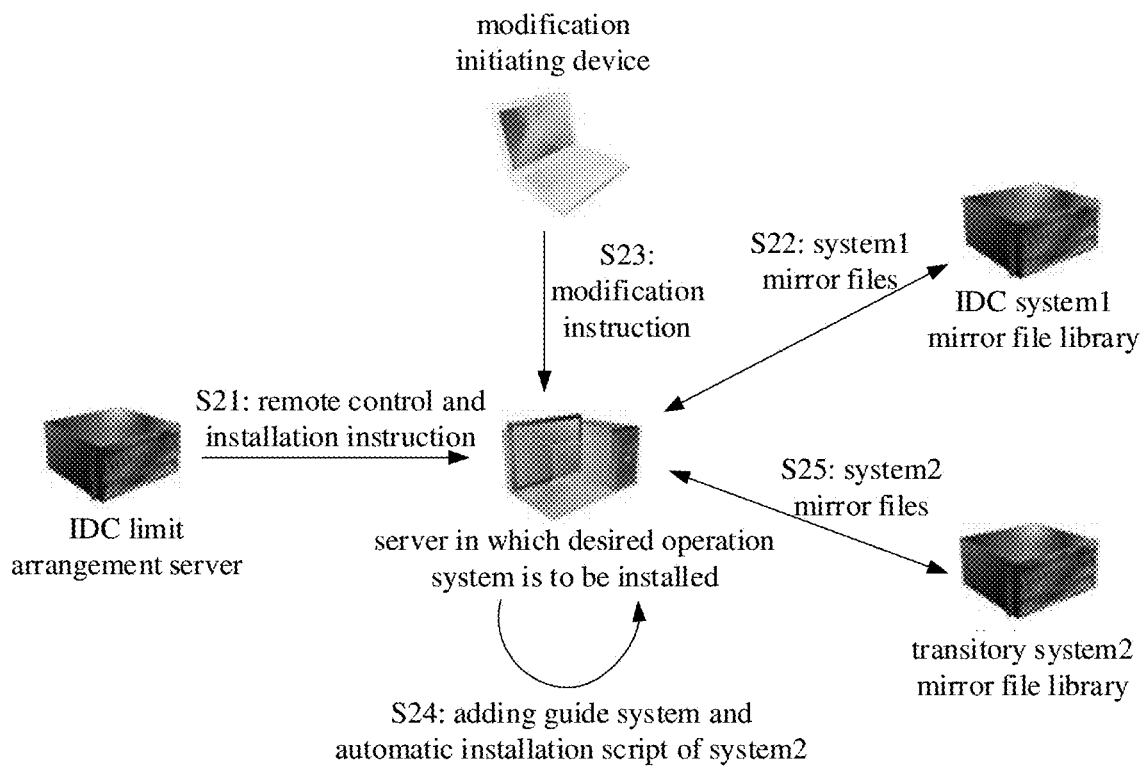
FIG. 2 is a flow chart illustrating a method for installing an operation system according to another embodiment of the present disclosure.

FIG. 2 is a flow chart illustrating a method for installing an operation system according to another embodiment of the present disclosure. An installation of a desired operation system in a server of the IDC is taken as an example for illustration in embodiments.

Generally, when an operation system is installed in the server of the IDC, the installation of the operation system is realized via a remote arrangement way through a unified installation platform. In addition, the default operation systems in the IDC are generally limited. For example, there are usually only three types of operation systems. As illustrated in FIG. 2, the unified installation platform may be called as an IDC limited arrangement server. In embodiments, for one server in which the desired operation system is to be installed, the desired operation system to be finally installed is other than the three types of operation systems.

Illustrated as FIG. 2, the method for installing an operation system includes the followings.

In block S21, a remote control and installation instruction is received.

For example, the server in which the desired operation system is to be installed receives the remote control and installation instruction sent by the IDC limited arrangement server.

In block S22, the data of the first operation system is acquired according to the remote control and installation instruction, and the first operation system is installed and launched according to the data of the first operation system.

For example, the first operation system is denoted as system1. The data of the first operation system may be called as IDC system1 mirror files. The IDC system1 mirror files are generated and stored in advance before the installation of the first operation system. A module storing the IDC system1 mirror files is called as an IDC system1 mirror file library.

The remote control and installation instruction may include storage location information of the data of the first operation system, such that the data of the first operation system is acquired from a corresponding location according to the storage location information.

For example, after the remote control and installation instruction is received by the server in which the desired operation system is to be installed, information of the IDC system1 mirror file library may be acquired from the remote control and installation instruction. And then, the IDC system1 mirror files may be acquired from the IDC system1 mirror file library.

After the IDC system1 mirror files are acquired, the installation of the system1 may be realized by using the IDC system1 mirror files. For example, the remote control and installation instruction further includes installation and configuration information of the system1. The installation and configuration information is configured to indicate how to install the system1. After the server acquires the IDC system1 mirror files and understands how to install the system1 according to the installation and configuration information, the system1 may be installed in the server. Furthermore, the system1 may be automatically launched after the installation of the system1.

It may be understood that, the first operation system refers to a default operation system of the limited IDC. Therefore, the installation of the first operation system may be achieved via the general remote arrangement way. The first operation system is for example CentOS 6.3.

Furthermore, after the first operation system is launched, the first operation system may be automatically configured to acquire automatic configuration information. The automatic configuration information includes for example: an IP address and a domain name of the server in which the desired operation system is to be installed.

In block S23, a modification instruction is received after the first operation system is launched. The modification instruction includes information of a guide system of the second operation system and information of an automatic installation script of the second operation system.

When the installed operation system needs to be modified, for example, when a finally desired operation system is the second operation system, the configuration information of the first operation system may be modified, to add the installation related information of the second operation system in the configuration information.

In embodiments, the added installation related information of the second operation system may include the guide system of the second operation system, and the automatic installation script of the second operation system.

In order to add the above-mentioned installation related information, the modification instruction may be sent to the server in which the desired operation system is to be installed by a modification initiating device, to trigger the modification of the configuration information of the first operation system and to further trigger the modification of the first operation system.

In block S24, the guide system of the second operation system is added into the configuration information of the first operation system according to the information of the guide system of the second operation system; and the automatic installation script of the second operation system is added into the configuration information of the first operation system according to the information of the automatic installation script.

It may be understood that, a sequence of adding the guide system of the second operation system and adding the automatic installation script information is not limited in embodiments.

When the guide system of the second operation system is added, the information of the guide system of the second operation system may be included in the modification instruction. The information of the guide system of the second operation system may be particular code data of the guide system of the second operation system or may be scripts for saving the particular code data. The server may acquire the scripts according to the information of the guide system of the second operation system and acquire the particular code data from the scripts.

The particular code data of the guide system of the second operation system may for example indicate a storage location of the data of the second operation system, such that the data of the second operation system is acquired according to the storage location.

When the automatic installation script is added, the information of the automatic installation script may be contained in the modification instruction. The server may acquire the automatic installation script according to the information of the automatic installation script.

The automatic installation script may include the installation and configuration information of the second operation system. The installation and configuration information is configured to indicate an installation way, i.e. how to install the second operation system. For example, the installation and configuration information indicates a segmentation way, software to be installed, configurations to be used and the like.

Therefore, the data of the second operation system may be acquired according to the guide system of the second operation system, and how to install the second operation system may be understood according to the automatic installation script, thereby achieving the installation of the second operation system.

The adding of the guide system of the second operation system into the configuration information may be for example adding pxe mirror launching configuration of CentOS7.1 into grub.

The automatic installation script added into the installation and configuration information is for example a kickstrat script of CentOS.

In addition, since some installation and configuration information may use information obtained after the first operation system is automatically configured, the method may further include the followings.

Automatic configuration information generated when the first operation system is automatically configured after being launched is acquired.

Information that needs to be retained in the automatic configuration information is recorded into the automatic installation script.

For example, the information that needs to be retained may be pre-arranged to be contained in the modification instruction. The server records the information that needs to be retained in the configuration information into the automatic installation script. The information that needs to be retained is for example an IP address and a domain name of the server.

In block S25, the data of the second operation system is acquired, and the second operation system is installed to replace the first operation system according to the data of the second operation system.

The installation of the second operation system may be realized according to the modified configuration information after the first operation system is relaunched. For example, an operation system relaunch instruction is received. The operation system relaunch instruction is triggered for example by a manager. The first operation system may be relaunched according to the operation system relaunch instruction. When the first operation system is relaunched, the first operation system may be replaced by the second operation system.

Specifically, the data of the second operation system may be acquired according to the guide system of the second operation system. The second operation system is installed to replace the first operation system in an installation way corresponding to the automatic installation script and according to the data of the second operation system.

For example, the data of the second operation system may be called as system2 mirror files, and a module storing the system2 mirror files is called as a transitory system2 mirror file library. The guide system of the second operation system may contain information of the transitory system2 mirror file library, thereby acquiring the system2 mirror files from the transitory system2 mirror file library. It may be understood that, the system2 mirror files are generated and stored in advance before the installation of the second operation system.

After the system2 mirror files are acquired, the installation of system2 may be realized according to the installation way indicated by the automatic installation script.

In addition, when the second operation system (system2) is installed, the second operation system may rewrite the first operation system (system1), to finally realize the installation of the second operation system. Since the information that needs to be retained in the automatic configuration information of system1 is recorded in the automatic installation script of the system2, the information that needs to be retained is retained in system2.

In embodiments, when the desired operation system needs to be installed in the server of the IDC, the first operation system is installed firstly. The second operation system is installed through the first operation system. The desired operation system other than default operation systems limited by the IDC is finally installed through two installations of the operation systems, which does not need to install the operation system manually with the aid of the compact disc. Therefore, problems caused by a manual installation of the operation system may be avoided, thereby improving efficiency of the installation of the operation system, reducing a cost of the installation of the operation system and improving accuracy of the installation of the operation system.

Figure 3:
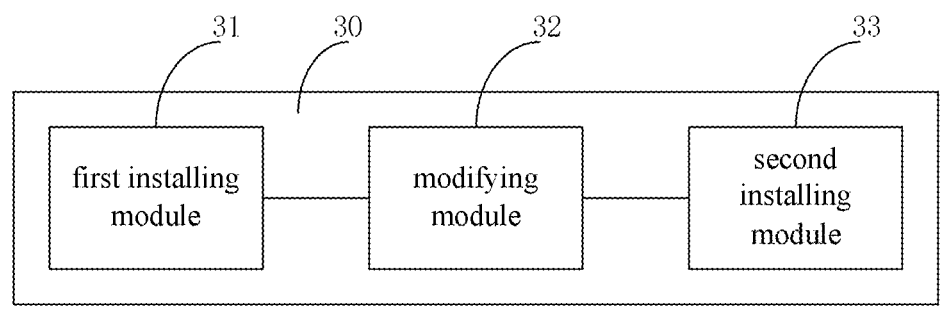
FIG. 3 is a block diagram illustrating an apparatus for installing an operation system according to still another embodiment of the present disclosure.

FIG. 3 is a block diagram illustrating an apparatus for installing an operation system according to still another embodiment of the present disclosure. The apparatus may be arranged in a server in which a desired operation system is to be installed. The apparatus 30 includes a first installing module 31, a modifying module 32 and a second installing module 33.

The first installing module 31 is configured to acquire data of a first operation system, and to install and launch the first operation system according to the data of the first operation system.

The first operation system may be installed via a general way of installing operation systems, for example with an aid of a compact disc, or through a remote control and installation instruction.

After the first operation system is installed, the first operation system may be automatically launched.

An installation of a desired operation system in a server of the IDC is taken as an example for illustration in embodiments.

Generally, when an operation system is installed in the server of the IDC, the installation of the operation system is realized via a remote arrangement way through a unified installation platform. In addition, the default operation systems in the IDC are generally limited. For example, there are usually only three types of operation systems. As illustrated in FIG. 2, the unified installation platform may be called as an IDC limited arrangement server. In embodiments, for one server in which the desired operation system is to be installed, the desired operation system to be finally installed is other than the three types of operation systems.

For example, the server in which the desired operation system is to be installed receives a remote control and installation instruction sent by the IDC limited arrangement server. The data of the first operation system is acquired according to the remote control and installation instruction, and the first operation system is installed and launched according to the data of the first operation system.

For example, the first operation system is denoted as system1. The data of the first operation system may be called as IDC system1 mirror files. The IDC system1 mirror files are generated and stored in advance before the installation of the first operation system. A module storing the IDC system1 mirror files is called as an IDC system1 mirror file library.

The remote control and installation instruction may include storage location information of the data of the first operation system, such that the data of the first operation system is acquired from a corresponding location according to the storage location information.

For example, after the remote control and installation instruction is received by the server in which the desired operation system is to be installed, information of the IDC system1 mirror file library may be acquired from the remote control and installation instruction. And then, the IDC system1 mirror files may be acquired from the IDC system1 mirror file library.

After the IDC system1 mirror files are acquired, the installation of the system1 may be realized by using the IDC system1 mirror files. For example, the remote control and installation instruction further includes installation and configuration information of the system1. The installation and configuration information is configured to indicate how to install the system1. After the server acquires the IDC system1 mirror files and understands how to install the system1 according to the installation and configuration information, the system1 may be installed in the server. Furthermore, the system1 may be automatically launched after the installation of the system1.

It may be understood that, the first operation system refers to a default operation system of the limited IDC. Therefore, the installation of the first operation system may be achieved via the general remote arrangement way. The first operation system is for example CentOS 6.3.

Furthermore, after the first operation system is launched, the first operation system may be automatically configured to acquire automatic configuration information. The automatic configuration information includes for example: an IP address and a domain name of the server in which the desired operation system is to be installed.

The modifying module 32 is configured to modify configuration information of the first operation system to add installation related information of a second operation system after the first operation system is launched.

In related arts, when a user desires to install one operation system, this operation system is directly installed.

In embodiments, when the user desires to install one operation system (such as the second operation system), another operation system (such as the first operation system) is used as an interim medium to realize an installation of the desired operation system.

When the first operation system is used as the interim medium, the configuration information of the first operation system may be modified to contain the installation related information of the second operation system, such that the second operation system is installed according to the installation related information of the second operation system.

Figure 4:
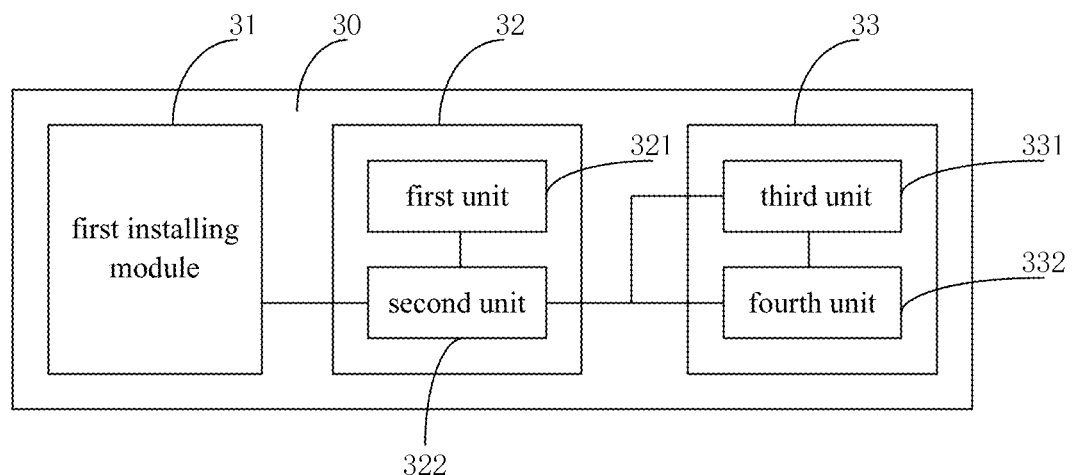
FIG. 4 is a block diagram illustrating an apparatus for installing an operation system according to yet another embodiment of the present disclosure.

In embodiments, as illustrated in FIG. 4, the modifying module 32 includes a first unit 321 and a second unit 322.

The first unit 321 is configured to receive a modification instruction. The modification instruction includes information of a guide system of the second operation system and information of an automatic installation script of the second operation system.

When the installed operation system needs to be modified, for example, when a finally desired operation system is the second operation system, the configuration information of the first operation system may be modified, to add the installation related information of the second operation system in the configuration information.

In embodiments, the added installation related information of the second operation system may include the guide system of the second operation system, and the automatic installation script of the second operation system.

In order to add the above-mentioned installation related information, the modification instruction may be sent to the server in which the desired operation system is to be installed by a modification initiating device, to trigger the modification of the configuration information of the first operation system and to further trigger the modification of the first operation system.

The second unit 322 is configured to add the guide system of the second operation system into the configuration information of the first operation system according to the information of the guide system of the second operation system; and to add the automatic installation script of the second operation system into the configuration information of the first operation system according to the information of the automatic installation script.

It may be understood that, a sequence of adding the guide system of the second operation system and adding the automatic installation script information is not limited in embodiments.

When the guide system of the second operation system is added, the information of the guide system of the second operation system may be included in the modification instruction. The information of the guide system of the second operation system may be particular code data of the guide system of the second operation system or may be scripts for saving the particular code data. The server may acquire the scripts according to the information of guide system of the second operation system and acquire the particular code data from the scripts.

The particular code data of the guide system of the second operation system may for example indicate a storage location of the data of the second operation system, such that the data of the second operation system is acquired according to the storage location.

When the automatic installation script is added, the information of the automatic installation script may be contained in the modification instruction. The server may acquire the automatic installation script according to the information of the automatic installation script.

The automatic installation script may include the installation and configuration information of the second operation system. The installation and configuration information is configured to indicate an installation way, i.e. how to install the second operation system. For example, the installation and configuration information indicates a segmentation way, software to be installed, configurations to be used and on the like.

Therefore, the data of the second operation system may be acquired according to the guide system of the second operation system, and how to install the second operation system may be understood according to the automatic installation script, thereby achieving the installation of the second operation system.

The adding of the guide system of the second operation system into the configuration information may be for example adding pxe mirror launching configuration of CentOS7.1 into grub.

The automatic installation script added into the installation and configuration information is for example a kickstrat script of CentOS.

In embodiments, as illustrated in FIG. 4, the apparatus 30 further includes a recording module 34.

The recording module 34 is configured to acquire automatic configuration information generated when the first operation system is automatically configured after the first operation system is launched; and to record information that needs to be retained in the automatic configuration information into the automatic installation script.

For example, the information that needs to be retained may be pre-arranged to be contained in the modification instruction. The server records the information that needs to be retained in the configuration information into the automatic installation script. The information that needs to be retained is for example an IP address and a domain name of the server.

The second installing module 33 is configured to acquire data of the second operation system according to the installation related information of the second operation system, and to install the second operation system to replace the first operation system according to the data of the second operation system.

After the data of the second operation system is acquired, the second operation system may be installed according to the data of the second operation system.

When the second operation system is installed, the second operation system may overwrite the already installed first operation system, to realize the replacement of the first operation system by the second operation system, to finally complete the installation of the second operation system.

In embodiments, the second installing module 33 is further configured to:

receive an operation system relaunch instruction; and acquire the data of the second operation system according to the installation related information of the second operation system after the operation system relaunch instruction is received, and install the second operation system to replace the first operation system according to the data of the second operation system.

In embodiments, as illustrated in FIG. 4, the second installing module 33 includes a third unit 331 and a fourth unit 332.

The third unit 331 is configured to acquire the data of the second operation system according to the guide system of the second operation system.

The fourth unit 332 is configured to install the second operation system to replace the first operation system in an installation way corresponding to the automatic installation script and according to the data of the second operation system.

For example, the data of the second operation system may be called as system2 mirror files, and a module storing the system2 mirror files is called as a transitory system2 mirror file library. The guide system of the second operation system may contain information of the transitory system2 mirror file library, thereby acquiring the system2 mirror files from the transitory system2 mirror file library. It may be understood that, the system2 mirror files are generated and stored in advance before the installation of the second operation system.

After the system2 mirror files are acquired, the installation of system2 may be realized according to the installation way indicated by the automatic installation script.

In addition, when the second operation system (system2) is installed, the second operation system may rewrite the first operation system (system1), to finally realize the installation of the second operation system. Since the information that needs to be retained in the automatic configuration information of system1 is recorded in the automatic installation script of the system2, the information that needs to be retained is retained in system2.

In embodiments, the first operation system is installed firstly. The second operation system is installed through the first operation system. A desired operation system is finally installed through two installations of the operation systems, which does not need to install the operation system manually with an aid of a compact disc. Therefore, problems caused by a manual installation of the operation system may be avoided, thereby improving efficiency of the installation of the operation system, reducing a cost of the installation of the operation system and improving accuracy of the installation of the operation system.

Embodiments of the present disclosure further provide an electronic device. The electronic device includes one or more processors, a memory and one or more programs stored in the memory. When the one or more programs are executed by the one or more processors:

data of a first operation system is acquired, and the first operation system is installed and launched according to the data of the first operation system;

configuration information of the first operation system is modified to add installation related information of a second operation system after the first operation system is launched; and data of the second operation system is acquired according to the installation related information of the second operation system, and the second operation system is installed to replace the first operation system according to the data of the second operation system.

Embodiments of the present disclosure further provide a non-transitory computer readable medium. The computer storage medium has one or more modules stored therein. When the one or more modules are executed:

data of a first operation system is acquired, and the first operation system is installed and launched according to the data of the first operation system;

configuration information of the first operation system is modified to add installation related information of a second operation system, after the first operation system is launched; and data of the second operation system is acquired according to the installation related information of the second operation system, and the second operation system is installed to replace the first operation system according to the data of the second operation system.

It should be illustrated that, in descriptions of the present disclosure, terms such as "first" and "second" are used herein for purposes of description and are not construed as indicating or implying relative importance or significance.

Furthermore, in the description of the present disclosure, "a plurality of" means at least two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for installing an operation system, comprising:

acquiring data of a first operation system from a server, and installing and launching the first operation system according to the data of the first operation system, wherein the first operation system is one of default operation systems that are capable of remote installation;

modifying configuration information of the first operation system to add installation related information of a second operation system after launching the first operation system according to instructions from a remote computer, wherein the second operation system is an operation system other than the default operation systems that are capable of remote installation, the modified configuration information including an internet protocol (IP) address and a domain name of a storage location for the second operation system; and acquiring data of the second operation system according to the installation related information of the second operation system, and installing the second operation system to replace the first operation system according to the data of the second operation system;

wherein, modifying the configuration information of the first operation system to add the installation related information of the second operation system comprises:

receiving a modification instruction, wherein the modification instruction comprises information of a guide system of the second operation system and information of an automatic installation script of the second operation system, wherein the information of the guide system includes a storage location of the data of the second operation system, and wherein the information of the automatic installation script of the second operation system includes disk segmentation, software, and operating system configuration information; and adding the guide system of the second operation system into the configuration information of the first operation system according to the information of the guide system of the second operation system; and adding the automatic installation script of the second operation system into the configuration information of the first operation system according to the information of the automatic installation script.

2. The method according to claim 1, wherein acquiring the data of the second operation system according to the installation related information of the second operation system and installing the second operation system to replace the first operation system according to the data of the second operation system, comprises:

receiving an operation system relaunch instruction; and acquiring the data of the second operation system according to the installation related information of the second operation system after receiving the operation system relaunch instruction, and installing the second operation system to replace the first operation system according to the data of the second operation system.

3. The method according to claim 1, wherein acquiring the data of the second operation system according to the installation related information of the second operation system, and installing the second operation system to replace the first operation system according to the data of the second operation system comprises:

acquiring the data of the second operation system according to the guide system of the second operation system; and installing the second operation system to replace the first operation system in an installation way corresponding to the automatic installation script and according to the data of the second operation system.

4. The method according to claim 3, further comprising:
acquiring automatic configuration information generated when the first operation system is automatically configured after being launched; and
recording information that needs to be retained in the automatic configuration information into the automatic installation script.

5. The method according to claim 3, wherein acquiring the data of the second operation system according to the installation related information of the second operation system and installing the second operation system to replace the first operation system according to the data of the second operation system, comprises:
receiving an operation system relaunch instruction; and
acquiring the data of the second operation system according to the installation related information of the second operation system after receiving the operation system relaunch instruction, and installing the second operation system to replace the first operation system according to the data of the second operation system.

6. The method according to claim 1, further comprising:
acquiring automatic configuration information generated when the first operation system is automatically configured after being launched; and
recording information that needs to be retained in the automatic configuration information into the automatic installation script.

7. The method according to claim 6, wherein acquiring the data of the second operation system according to the installation related information of the second operation system and installing the second operation system to replace the first operation system according to the data of the second operation system, comprises:
receiving an operation system relaunch instruction; and
acquiring the data of the second operation system according to the installation related information of the second operation system after receiving the operation system relaunch instruction, and installing the second operation system to replace the first operation system according to the data of the second operation system.

8. The method according to claim 1, wherein acquiring the data of the second operation system according to the installation related information of the second operation system and installing the second operation system to replace the first operation system according to the data of the second operation system, comprises:
receiving an operation system relaunch instruction; and
acquiring the data of the second operation system according to the installation related information of the second operation system after receiving the operation system relaunch instruction, and installing the second operation system to replace the first operation system according to the data of the second operation system.

9. An electronic device, comprising:
one or more processors;
a memory;
one or more programs stored in the memory,
wherein the one or more processors are configured to read the one or more programs to execute acts of:

acquiring data of a first operation system from a server, and installing and launching the first operation system according to the data of the first operation system, wherein the first operation system is one of default operation systems that are capable of remote installation;

receiving a modification instruction from a remote computer, including an internet protocol (IP) address and a domain name of a storage location for a second operation system, wherein the modification instruction comprises information of a guide system of the second operation system and information of an automatic installation script of the second operation system, the second operation system is an operation system other than the default operation systems that are capable of remote installation, wherein the information of the guide system includes a storage location of the data of the second operation system, and wherein the information of the automatic installation script of the second operation system includes disk segmentation, software, and operating system configuration information;

adding the guide system of the second operation system into the configuration information of the first operation system according to the information of the guide system of the second operation system; and adding the automatic installation script of the second operation system into the configuration information of the first operation system according to the information of the automatic installation script; and acquiring data of the second operation system according to the installation related information of the second operation system, and installing the second operation system to replace the first operation system according to the data of the second operation system.

10. The electronic device according to claim 9, wherein the one or more processors are configured to modify the configuration information of the first operation system to add the installation related information of the second operation system by acts of:
receiving a modification instruction, wherein the modification instruction comprises information of a guide system of the second operation system and information of an automatic installation script of the second operation system; and
adding the guide system of the second operation system into the configuration information of the first operation system according to the information of the guide system of the second operation system; and adding the automatic installation script of the second operation system into the configuration information of the first operation system according to the information of the automatic installation script.

11. The electronic device according to claim 10, wherein the one or more processors are configured to acquire the data of the second operation system according to the installation related information of the second operation system, and installing the second operation system to replace the first operation system according to the data of the second operation system by acts of:
acquiring the data of the second operation system according to the guide system of the second operation system; and
installing the second operation system to replace the first operation system in an installation way corresponding to the automatic installation script and according to the data of the second operation system.

12. The electronic device according to claim 10, wherein the one or more processors are further configured to read the one or more programs to execute acts of:
- acquiring automatic configuration information generated when the first operation system is automatically configured after being launched; and
- recording information that needs to be retained in the automatic configuration information into the automatic installation script.

13. The electronic device according to claim 9, wherein the one or more processors are configured to acquire the data of the second operation system according to the installation related information of the second operation system and installing the second operation system to replace the first operation system according to the data of the second operation system by acts of:
- receiving an operation system relaunch instruction; and
- acquiring the data of the second operation system according to the installation related information of the second operation system after receiving the operation system relaunch instruction, and installing the second operation system to replace the first operation system according to the data of the second operation system.

14. A non-transitory computer storage medium having one or more modules stored therein, wherein when the one or more modules are executed, a method for installing an operation system is executed, the method comprising:
- acquiring data of a first operation system from a server, and installing and launching the first operation system according to the data of the first operation system, wherein the first operation system is one of default operation systems that are capable of remote installation;
- receiving a modification instruction from a remote computer, including an internet protocol (IP) address and a domain name of a storage location for a second operation system, wherein the modification instruction comprises information of a guide system of the second operation system and information of an automatic installation script of the second operation system, the second operation system is an operation system other than the default operation systems that are capable of remote installation, wherein the information of the guide system includes a storage location of the data of the second operation system, and wherein the information of the automatic installation script of the second operation system includes disk segmentation, software, and operating system configuration information;
- adding the guide system of the second operation system into the configuration information of the first operation system according to the information of the guide system of the second operation system; and adding the automatic installation script of the second operation system into the configuration information of the first operation system according to the information of the automatic installation script; and
- acquiring data of the second operation system according to the installation related information of the second operation system, and installing the second operation system to replace the first operation system according to the data of the second operation system.

15. The non-transitory computer storage medium according to claim 14, wherein modifying the configuration information of the first operation system to add the installation related information of the second operation system comprises:
- receiving a modification instruction, wherein the modification instruction comprises information of a guide system of the second operation system and information of an automatic installation script of the second operation system; and
- adding the guide system of the second operation system into the configuration information of the first operation system according to the information of the guide system of the second operation system; and adding the automatic installation script of the second operation system into the configuration information of the first operation system according to the information of the automatic installation script.

16. The non-transitory computer storage medium according to claim 15, wherein acquiring the data of the second operation system according to the installation related information of the second operation system, and installing the second operation system to replace the first operation system according to the data of the second operation system comprises:
- acquiring the data of the second operation system according to the guide system of the second operation system; and
- installing the second operation system to replace the first operation system in an installation way corresponding to the automatic installation script and according to the data of the second operation system.

17. The non-transitory computer storage medium according to claim 15, wherein the method further comprises:
- acquiring automatic configuration information generated when the first operation system is automatically configured after being launched; and
- recording information that needs to be retained in the automatic configuration information into the automatic installation script.

18. The non-transitory computer storage medium according to claim 14, wherein acquiring the data of the second operation system according to the installation related information of the second operation system and installing the second operation system to replace the first operation system according to the data of the second operation system, comprises:
- receiving an operation system relaunch instruction; and
- acquiring the data of the second operation system according to the installation related information of the second operation system after receiving the operation system relaunch instruction, and installing the second operation system to replace the first operation system according to the data of the second operation system.

* * * * *